United States Patent
Sharma et al.

(10) Patent No.: US 7,810,063 B1
(45) Date of Patent: Oct. 5, 2010

(54) GRAPHICAL USER INTERFACE FOR PROTOTYPING EARLY INSTANCE DENSITY

(75) Inventors: Harsh Dev Sharma, San Jose, CA (US); Po-chiang Albert Lee, Livermore, CA (US); Rajeev Srivastava, San Jose, CA (US); Srinivas R. Kommoori, Milpitas, CA (US); Bharat Bhushan, Santa Clara, CA (US); Mithunjoy Parui, Mountain View, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 380 days.

(21) Appl. No.: 11/670,366

(22) Filed: Feb. 1, 2007

(51) Int. Cl.
*G06F 17/50* (2006.01)
(52) U.S. Cl. ...................................................... 716/11
(58) Field of Classification Search .................. None
See application file for complete search history.

(56) References Cited

U.S. PATENT DOCUMENTS

| | | | |
|---|---|---|---|
| 5,850,349 A * | 12/1998 | Hirai et al. ...................... 716/12 |
| 7,234,125 B1 * | 6/2007 | Scott et al. ...................... 716/17 |
| 2002/0162080 A1 * | 10/2002 | Takahashi et al. .............. 716/7 |
| 2003/0226126 A1 * | 12/2003 | Iwai et al. ........................ 716/6 |
| 2005/0034091 A1 * | 2/2005 | Harn .............................. 716/6 |
| 2005/0138590 A1 * | 6/2005 | Amundson et al. ............ 716/11 |

* cited by examiner

*Primary Examiner*—Vuthe Siek
*Assistant Examiner*—Aric Lin
(74) *Attorney, Agent, or Firm*—Sheppard Mullin Richter & Hampton LLP (57) ABSTRACT

According to various embodiments of the invention electronic circuit design information can be presented to a designer by determining an electronic circuit comprising at least two gates and by determining a distance of one gate relative to another gate in a stage. A visual indicator for the stage can be calculated based on the distances between at least two gates in the stage. The visual indicator can then be displayed. The visual indicator can be a color and the relative distance can be indicated by brightness, hue or saturation, etc. Alternatively, the visual indicator can be a pattern and the relative distance between at least two gates can be indicated by darkness of the pattern.

24 Claims, 9 Drawing Sheets

GRAPHICAL USER INTERFACE FOR PROTOTYPING EARLY INSTANCE DENSITY

TECHNICAL FIELD

The present invention relates to design tools, and more particularly, some embodiments relate to graphical presentation within design tools.

DESCRIPTION OF THE RELATED ART

Currently circuit design tools do not allow designers to visually identify the relative impact of cell placement density and timing. For example, peak power demand can be based on various variables that are not generally available until later stages of the design flow using current tools. Even after analysis tools are run, there is very little means by which to display the available information. For example, the information is not made available in a graphical form that can, in some cases, be more quickly interpreted by a designer. Generally, in current circuit design tools, the information may be made available in the form of text based reports, if at all.

Current electronic circuit design tools generally only display limited information using the tools graphical user interface. For example, some tools may display the physical size of the cells in a design by displaying a scaled representation of the cells in the design. Some tools may also display the orientation of the cells in a design or allow the user to display the type of cell. For example, the user may be able to highlight cells in order to identify different cell types, e.g., memory, custom IP, etc.

While current tools generally use a graphical user interface to display physical size, orientation, and type of cells, no relative information, e.g., power, IR drop, etc., is displayed. Additionally, no early timing information is displayed on an instance. Density information is also not displayed or highlighted for the user. Timing and relative information is generally only available as part of the post route and optimization stage. Further, even after the post routing and optimization stage the capability may not exist to provide the user with the information using a graphical user interface, requiring the user to, for example, read through text reports to find the desired information.

Because current tools do not display relative information and do not include a graphical representation of timing or density information the user must wait until the post routing and optimization stage. For this reason, a great deal of design effort can be wasted. If problems are later found, this effort can be a waste because the designer must then modify the design late in the design process.

BRIEF SUMMARY OF EMBODIMENTS OF THE INVENTION

According to various embodiments of the invention, electronic circuit design information can be presented to a designer by evaluating an electronic circuit. The design can comprise at least two gates. These gates can be a stage in a timing path of the design. A distance from one gate relative to another gate in the stage can be calculated and a visual indicator for the stage can be calculated based on the distances between at least two gates in the stage. The visual indicator can then be displayed.

According to an embodiment of the invention, the visual indicator can be a color and the relative distance can be indicated by brightness, hue or saturation. For example, the viability of a design can, in one embodiment, be determined by the color of an instance. This graphical information can provide a designer with a display that graphically shows, e.g., relative timing, area, distance, relative power consumption, etc. This information is provided during the prototyping stage of a design rather than late in the design after the post routing and optimization stage. This can in some embodiments, allow for early identification of potential problems in synthesis and placement. This can also in some cases reduce the iterative process normally associative with placement timing and analysis because the designer may be able to find problems earlier in the design.

In yet another embodiment of the invention, the visual indicator can be a pattern and the relative distance between at least two gates can be indicated by, e.g., the darkness of the pattern, the boldness of the pattern, the transparency of the pattern, etc.

In another embodiment of the invention the distance between at least two gates can be determined as a Manhattan distance. The Manhattan distance is the distance between two points measured along axes at right angles. Thus, the Manhattan distance can be thought of as the shortest distance a car would need to travel when driving from point A to point B in a city laid out in a grid of square blocks. In a circuit design, the Manhattan distance can be the distance between cells along routing resources laid out in a grid of square blocks.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward systems and methods for graphically presenting circuit design information with a design tool.

Figure 2:
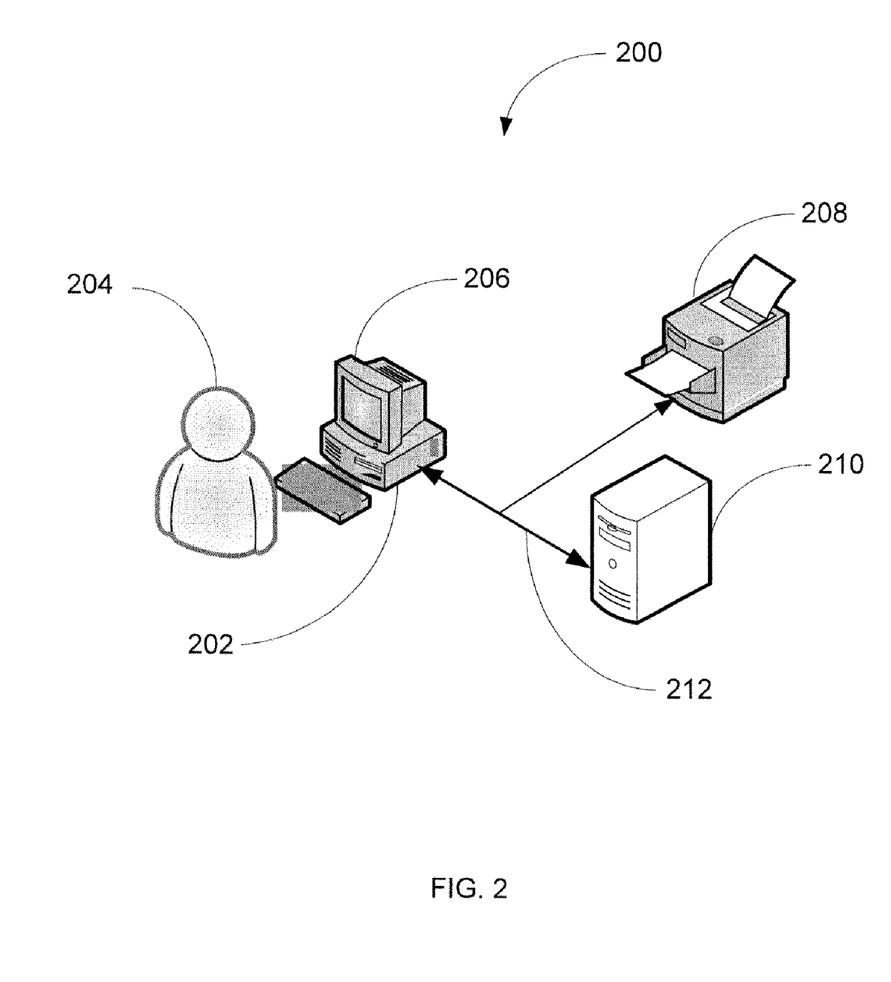
FIG. 2 is a diagram illustrating an example environment in which the systems and methods described herein can be implemented.

Before describing the invention in detail, it is useful to describe an example environment with which the invention can be implemented. One such example is illustrated in FIG. 2. FIG. 2 depicts a computer aided design system 200 that can be used by a designer 204 to design, for example, electronic circuits. System 200 can include a computer 202 and a monitor 206. The computer can be a laptop computer, desk top computer, handheld computer, mainframe computer, etc. Any computing system capable of running software implementing the systems and methods described herein can be used. Monitor 206 can be a CRT, flat screen, etc.

The designer 204 can input the design into computer 202 using various peripherals such as a mouse, keyboard, track ball, etc. If computer 202 is a mainframe, designer 204 can access computer 202 using, for example, a dumb terminal. Additionally, computer 202 can be connected to a printer 208 and a server 210 using a network 212. Server 210 can, for example, be used to store additional software programs and data. In one embodiment software implementing the systems and methods described herein can be stored on a hard drive in server 210. Thus, the software can be run from the hard drive in server 210. In another embodiment software implementing the systems and methods described herein can be stored on a hard drive in computer 202. Thus, the software can be run from the hard drive in computer 202. Therefore, in this embodiment, the software can be used weather or not computer 202 is connected to network 212. In yet another embodiment printer 208 can be connected directly to computer 202. Thus, computer 202 can print whether or not it is connected to network 212.

Computers 202, servers 210, printers 208, and computer networks 212 are well known. Therefore, for the sake of brevity, other example environments will not be discussed. It will, however, be apparent to those of skill in the art that the systems and methods described herein can be used in conjunction with many different environments. Additionally, a computer system 900 will be discussed in more detail with respect to FIG. 9. Computer system 900 can be the same as or similar to computer 202.

From time-to-time the present invention is described herein in terms of the example environment. Description in terms of the environment is provided to allow the various features and embodiments of the invention to be portrayed in the context of an exemplary application. After reading this description, it will become apparent to one of ordinary skill in the art how the invention can be implemented in different and alternative environments.

Figure 1:
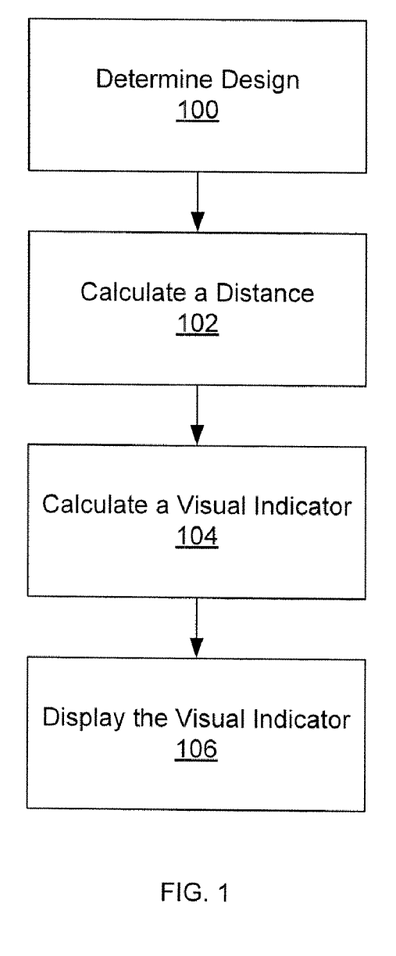
FIG. 1 is a flowchart illustrating an example method of providing a graphical user interface for use in a circuit design system.

FIG. 1 is a flowchart illustrating an example method of providing a graphical user interface for use in a circuit design system. In a block 100 an electronic circuit design can be evaluated. This can be, for example, an initial placement. The design can comprise at least two gates and generally will comprise many more gates. Each of these gates can be placed relative to each other on a simulated die within the initial placement.

The design can be broken down into stages in one or more timing paths in the design. Stages can generally be defined as any group of gates that can change logic states at some time relative to each other, such that, if the gates are located near each other, shared resources might be impacted. For example, any group of gates immediately following a set of latches clocked by the same clock might be considered to be in the same stage because each of these gates might change at about the same time after the latches change. Thus, they may all draw current at about the same time. Therefore, these cells can impact power distribution resources that they might share if the cells are located near each other. Stages are discussed further with respect to FIG. 7.

In a block 102 a distance from one gate relative to another gate in the stage can be calculated. A number of different approaches might be used to determine distance, for example, distance can be a simple straight line distance between cells. The distance can be any combination of resources on a die to connect at least two gates. Thus, if two gates are connected by a straight line the straight line distance can be used.

In another embodiment of the invention the distance between at least two gates can be determined as a Manhattan distance. The Manhattan distance is the distance between two points measured along axes at right angles. The name Manhattan distance comes from the fact that the city of Manhattan is laid out in square blocks and the Manhattan distance is the shortest distance a car would drive in a city laid out in square blocks when going from one point to another. (In a city laid out in square blocks you can not always travel from one point to another in a straight line. You would have to follow the available streets.) In a circuit design, Manhattan distance can be the distance between cells along routing resources laid out in a grid of square blocks.

In yet another embodiment angular routing can be used. Thus, if two gates are connected by, for example, two straight line that connect to each gate and meet at a 45 degree angle then an angular distance can be used. As used in herein angular distance can be the distance along one or more routing resource that run at angles to each other. (Thus, Manhattan distance can be thought of as an angular distance where the angles are 90 degrees.) The distance calculation can be based on any routing resources available. For example, a combination of Manhattan distance and angular distance can be used. Therefore, if the routing resources include a square grid that also includes two sets of routing resources running from corner to corner of the square at a 45 degree angle to the grid a combination of Manhattan distance and angular distance can be used.

It will be understood that these are examples of possible routing resources. The types of distance measurements used can vary from implementation to implementation and for each different device routed based on the routing resources available. Thus, if one or more gates are connected using a routing resource that is circular then circular distance can be used.

In a block 104 a visual indicator can be calculated. The visual indicator can highlight potential problem areas for the designer. Examples of visual indicators can include colors, patterns, etc. When color is used as a visual indicator different shades of color can be used to indicate, for example, the number of instances of cells in a given stage within a given area. Shades of color can also be used to indicate the use of other resources, such as power demand, IR drop, wire congestion, etc. Other embodiments can use hue, saturation, etc. to indicate for example, the number of instances within a given area, power demand, IR drop, wire congestion, etc. IR drop is the voltage drop due to current flow, I, through a resistance, R.

Patterns can also be used as a visual indicator within a given area. When patterns are used the boldness of the pattern or the transparency of the pattern can be used to indicate, for example, the number of instances within a given area, power demand, IR drop, wire congestion, etc.

In another embodiment a single or small number of colors can be used to indicate potential problems in a design. For example red could be used to indicate problem areas, while green could be used to indicate areas that are acceptable. In this embodiment, different stages can not be differentiated visually, however, in some cases, it may be more important to a designer to see the problem areas, regardless of what stage these problems areas are in. In another embodiment, however, colors and patterns can be combined so that, for example, problem areas can be seen in red and different stages can be determined by looking at the pattern used.

It will be understood that the examples of color, pattern, shades, boldness, hue, saturation, combinations of color and pattern, etc. are only examples of many different kinds of visual indicator that can be used. It will also be understood that although brightness, boldness, etc. can indicate a problem area the opposite can also be true. For example, a bright area can be a good distribution in one embodiment.

In a block 106 the visual indicator can be displayed. For example, the indicator can be displayed on a computer monitor, printed, etc. This allows the designer to review the design and make any changes deemed desirable, appropriate, or necessary.

The areas highlighted by the systems and methods described herein may or may not be changed by the designer. As with many engineering design issues there are often trade-offs. For example, the need for quicker timing for some set of signals can, in some cases, out weight the desire to decrease the size of the resources needed to supply power to that part of a chip. The systems and methods described herein can be implemented in one embodiment to provide a tool to allow the designer to make better informed decisions about a design, even if the decision is not to change a part of a particular design.

Figure 3:
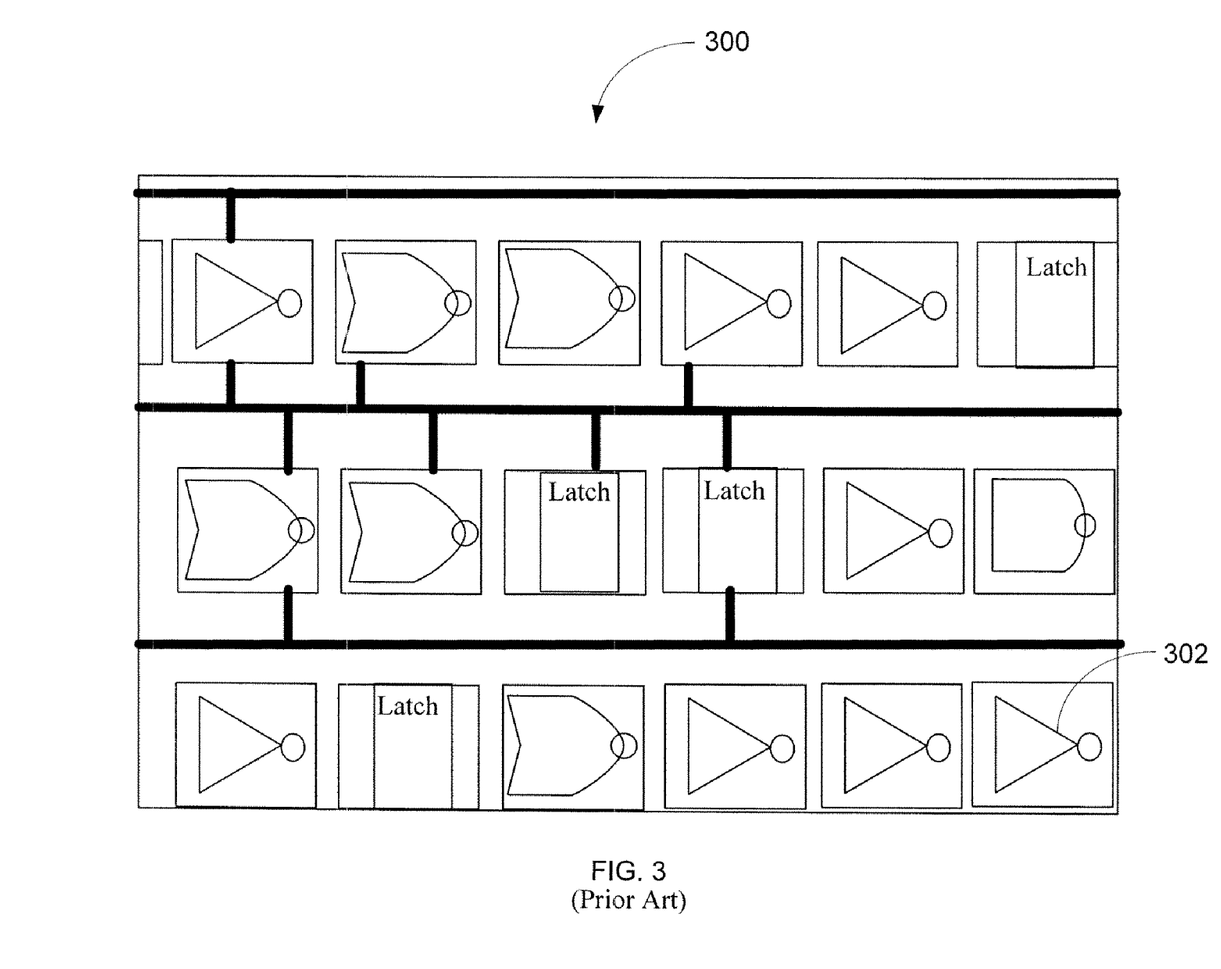
FIG. 3 is a diagram illustrating an example circuit design placement.

FIG. 3 is a diagram illustrating an example circuit design placement 300. Circuit placement 300 illustrates what a graphical user interface of a placed netlist might look like with no graphical information representing, for example, cell density, timing, etc. Circuit placement 300 can be, for example, an area of a larger placement on a die. While the circuit placement 300 provides the designer with information regarding placement of cells and routing to those cells, the circuit placement 300 does not include information regarding timing and relative position calculations. A circuit placement that includes graphical information representing, for example, timing, relative position calculations, etc., will be discussed with respect to FIG. 4.

Figure 4:
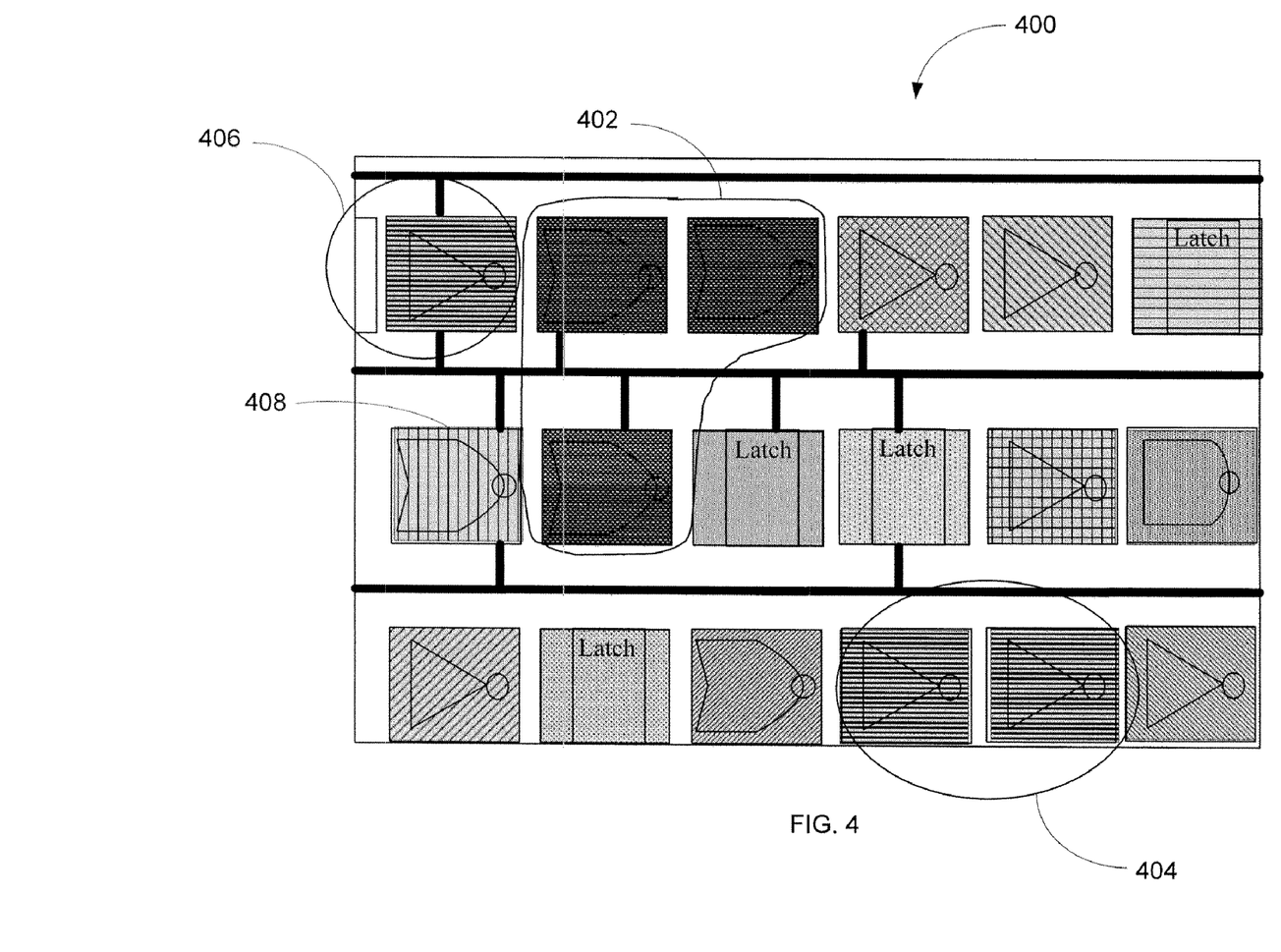
FIG. 4 is a diagram illustrating an example circuit design placement that can include timing and relative position calculations in accordance with one embodiment of the systems and methods described herein.

FIG. 4 is a diagram illustrating an example of a circuit design placement 400 that can include timing and relative position calculations in accordance with one embodiment of the systems and methods described herein. Placement 400 can be displayed, for example, in a block 106 of FIG. 1. Because FIG. 4 is a black and white drawing, line drawing patterns will be used to indicate different cells in the same stage. Additionally, darker cells will be used to indicate cells located proximate to each other. It will be understood that many different types of visual cues can be used to indicate cells in the same stage and cells located proximately to each other.

Circuit placement 400 can be, for example, an area of a larger placement on a die. Thus, cells in circuit placement 400 can be shaded based on instances of cells in the same stage located within the area of circuit placement 400. The area of circuit placement 400 can be selected by the designer or selected automatically, for example, when the method is implemented in software, the software can allow the designer to select the area or the area can be automatically selected by the software.

Circuit design placement 400 can include cells 402. Cells 402 can be in the same timing domain. Therefore, the cells can use the same visual indicator. For example, the cells can all be the same color, the same pattern, etc. Additionally, cells 402 are all located proximately to each other and in the same defined area. Thus, cells 402 can be brighter, darker, or some other visual indication can be used to indicate to designer 204 that the cells may be located too close together and are part of the same stage.

Cells 404 and 406 are also included in design 400. Cells 404 and 406 can be in the same timing domain. Unlike cells 402, however, cells 404 and 406 are not as tightly packed together. Cells 404 are located near each other but cell 406 is located several cells away. Thus, cells 404 and 406 are not shaded as darkly as cells 402. Further, in another embodiment cell 406 can be shaded lighter than cells 404 to indicate that cell 406 is not located near cells 404. For example, cell 406 can be shaded similarly to cell 408. (Perhaps cell 406 can be shaded a little darker than cell 408 because other instances of the stage are in the same general area of placement 400.)

Figure 8:
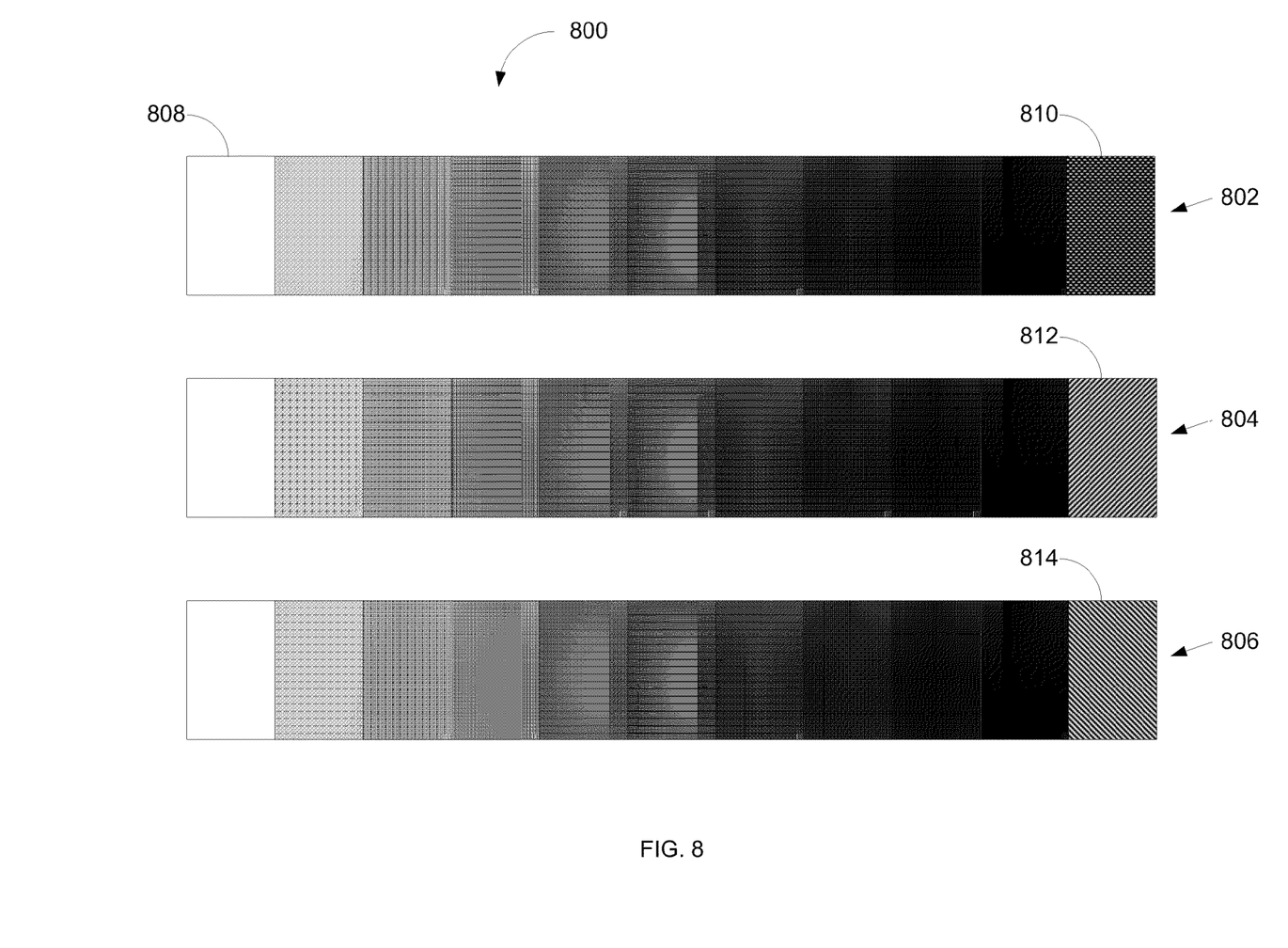
FIG. 8 is a diagram illustrating different patterns and transparencies that can be used in conjunction with the systems and methods described herein.

Cell 408 is not located near any other cells that may be part of that stage, thus, cell 408 is shaded even more lightly than cells 404 and 406. Examples of different patterns will be discussed in more detail with respect to FIG. 8. While FIG. 8 illustrates an example illustrating a defined area it will be understood that the systems and methods described herein can be applied across on entire chip. Thus, the distance of cells in a stage can be measured for the entire chip, not just within a defined area of a chip.

Figure 5A:
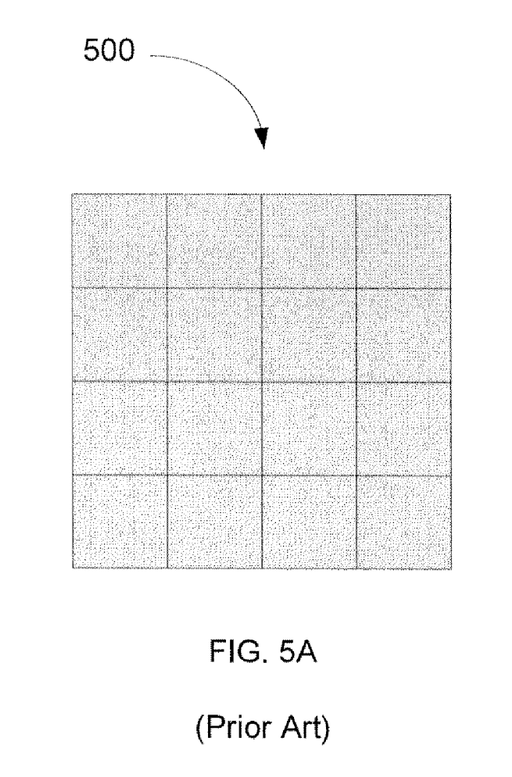
FIG. 5A is a diagram illustrating an example circuit design placement.

FIG. 5A is a diagram illustrating an example circuit design placement 500. The example design placement comprises an array of 4 by 4 cells, 16 cells total. Generally, an actual design would typically include many more cells. FIG. 5A illustrates an example placement 500 that does not include timing and relative position calculations. Thus, FIG. 5 is similar to FIG. 3.

Figure 5B:
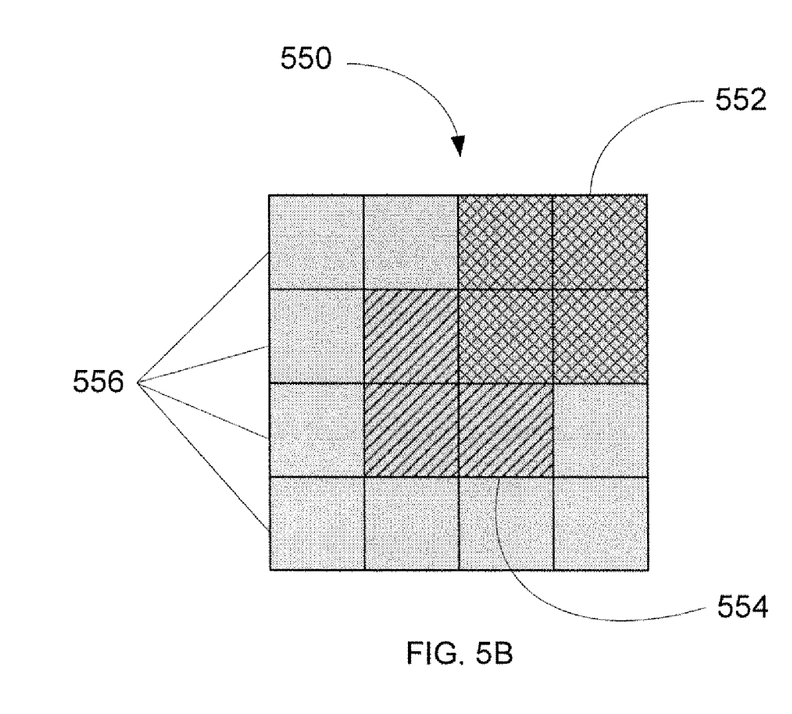
FIG. 5B is an diagram illustrating an example circuit design placement that can include timing and relative relationship calculations in accordance with one embodiment of the systems and methods described herein.

FIG. 5B is an diagram illustrating an example of a circuit design placement 550 that can include timing and relative relationship calculations in accordance with one embodiment of the systems and methods described herein. The relative relationship may be any thing that can effect a design as a result of relative placement, e.g., power, IR drop, etc. Similarly to FIG. 5A, the example of FIG. 5B comprises an array of 4 by 4 cells, 16 cells total. Again generally, an actual design would include many more cells, however, the 16 cell placement 550 is a simplified design to illustrate the systems and methods described herein.

Placement 550 includes a number of cells 556 that can be considered to be good distributions as indicated by the light shading. These cells are not located near other cells in the same stage. Cells 552 and 554 are each sets of cells that can lead to potential problems. Cells 552 include 4 cells in the same stage. Each of the four cells 552 is located adjacent to each other. Thus power distribution traces will need to be large enough to supply current when all of the cells in that stage change at the same time.

By using the systems and methods described herein, the designer can, in some embodiments, identify issues related to timing, power consumption, and IR drop, etc. For example, in some embodiments, the designer can identify and display relationships of cells and their relative timing. This can, for example, be achieved by identification of each cell position in the logic cone, e.g., group of logic paths.

In one embodiment information can be highlighted based on an algorithm that changes a color's shade based on distance between at least two gates. The designer can define the colors used. Alternatively, the area can be determined by position of the placement. Further, the designer can define the area and gradient of color based on the number of instances in that area. Alternatively, in another embodiment, the colors can be preset.

By visually inspecting the result of the placement and the relative position of the cells in one or more stages in a design, the designer can validate the quality of the synthesis tool as well as the placement tool. By correcting design problems early using the systems and methods described herein the designer can, in some cases, prevent major design issues that, in previous design tools, would not usually be found until much later in the design process. Thus, in some, cases the iterative process of the design can be reduced, thereby reducing, e.g., time to market of chips, chip development costs, etc.

Figure 6:
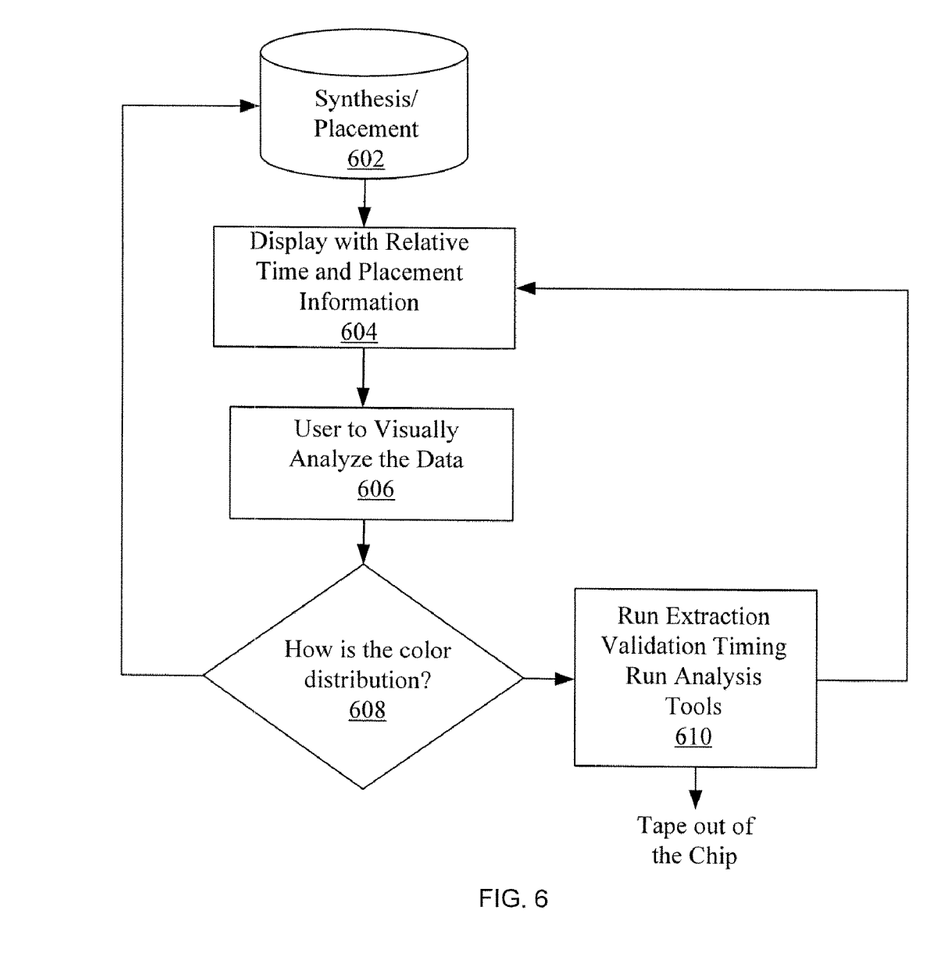
FIG. 6 is a flowchart illustrating an example method of designing a circuit using the systems and methods described herein.

FIG. 6 is a flowchart illustrating an example method of designing a circuit using the systems and methods described herein. In a block 602 synthesis/placement of an electronic design can occur.

In a block 604 relative timing and placement can be displayed. For example, using the method discussed with respect to FIG. 1. If relative timing and placement are displayed the user can visually analyze the design in a block 606.

In a block 608 the user can determine how the color(s) are distributed in the design (assuming color is used as the visual indicator). If the displayed design indicates potential problems, then the designer can make changes to the design, e.g., certain gates within a design can be moved such that they are not located in the same area. For example, a block 602 synthesis/placement can be repeated.

When a designer is visually analyzing the data in a block 606 and determining if the color distribution is acceptable in a block 608 the user can make decisions about the potential viability of one or more solutions considered. When visual analysis is not used the chances of finding issues that are caused by relative placement can be lessened or eliminated. The running of post analysis can also be used in conjunction with the systems and methods described herein to further validate the design, e.g., after the visual validation. In some cases, the post analysis will determine that the visual validation has lead to an acceptable design. Running these post routing and analysis stage tools can be time consuming. Further, the time may be wasted if the design is later discarded in favor of a new placement.

By visually analyzing the placement early in the design process the designer may be able to better select which placement solution is viable if multiple placements are generated for example, by using multiple placement algorithms. Further the designer may be able to determine how changing various controls in one or more placement algorithms can affect the design. This can allow the designer to make more informed design decisions because the designer can visually determine the impact of timing and relative placement in the design.

Other design criterion can, however, be more important than the impact on shared resources. Thus, the tool can simply highlight potential problem areas for the designer, rather than automatically change areas where multiple gates from the same stage are located proximately to each other.

When the user determines that the color distribution of a design is adequate then, in block 610 the user can run extraction and validation timing analysis tools. If the resulting design is found to be acceptable, then the chip can be taped out. Otherwise, the design can be displayed with relative timing and placement information and the user can further analyze the design and make additional changes.

Figure 7:
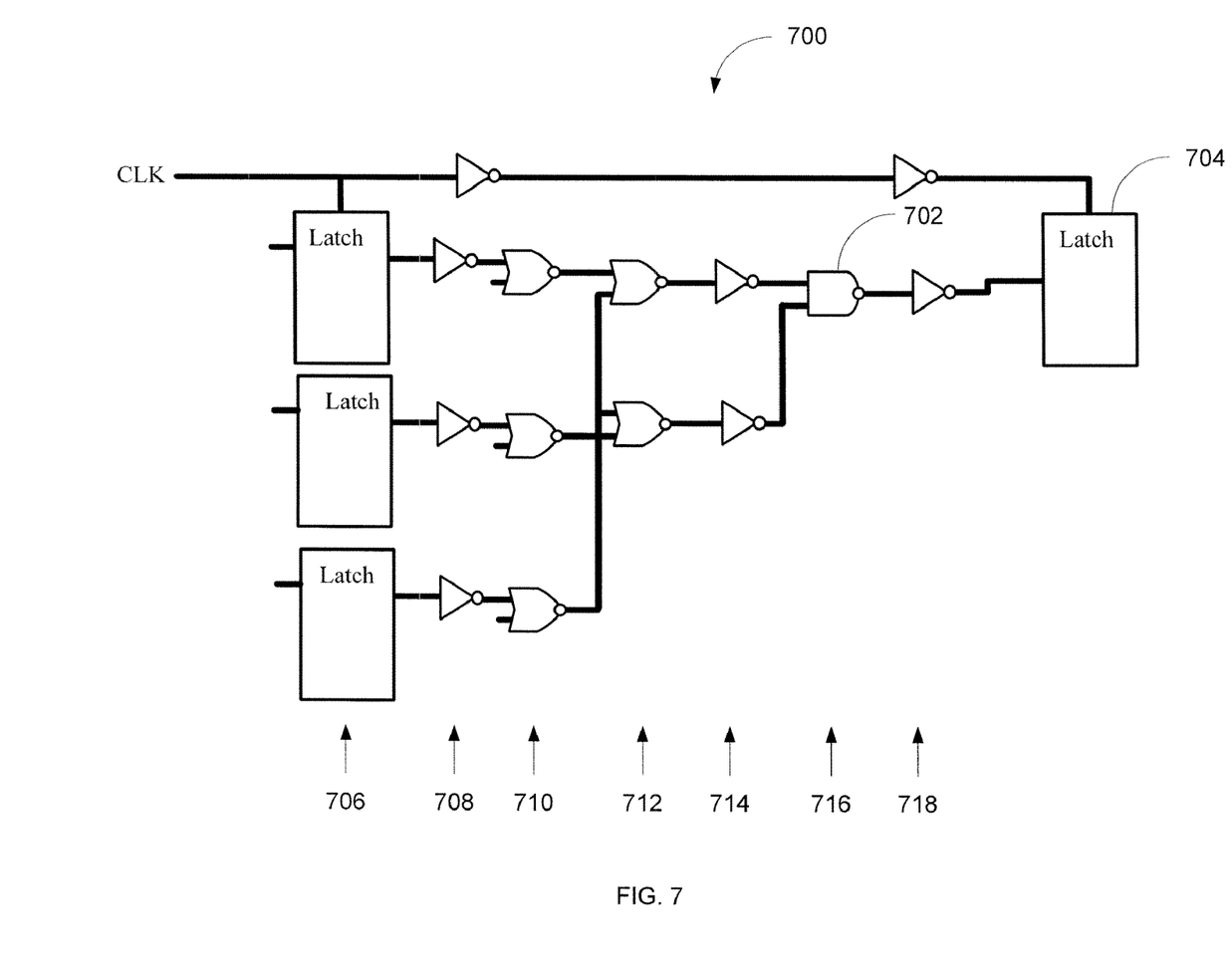
FIG. 7 is a schematic diagram illustrating a circuit design that can be applied to the systems and methods described herein.

FIG. 7 is a schematic diagram 700 illustrating an example of a circuit design that can be applied to the systems and methods described herein. Schematic diagram 700 includes various gates, such as NAND gate 702 and various latches, such as latch 704. The logic in diagram 700 can be grouped into different stages. For example, in one embodiment, after latches 706 logic 708 can make up stage 1, logic 710 can make up stage 2, logic 712 can make up stage 3, logic 714 can make up stage 4, logic 716 can make up stage 5, and logic 718 can make up stage 6. Thus, it can be advantageous to locate gates 708 at different locations on a die because the group of gates can change logic states at about the same time and if the gates are located near each other, shared resources can be impacted.

It should be pointed out, as discussed above, that other design criterion can be more important than the impact on shared resources. For example, it can be important to locate gates 708 near each other to improve timing, decrease the use of routing resources, etc. Thus, the tool can simply highlight potential problem areas for the designer rather than automatically change areas where multiple gates from the same stage are located proximately to each other. In another embodiment, however, some gates can be moved automatically, while others are highlighted for the designer.

Stages can generally be defined as any group of gates that can change logic states at some time relative to each other, such that, if the gates are located near each other, shared resources can be impacted. For example, gates 708 can be a stage, gates 710 can be a stage, etc. In another embodiment for example, if all the gates between latches 706 and latch 704 can change quickly enough then gates 708-718 can all be included in the same stage. On the other hand, if, for example, the current requirements of gates 708 decrease quickly after gates 708 change, then any change in gates 710 due to changes in the outputs of gates 708 may not impact the shared resources of those gates 708 and 710. Therefore, in some cases it may not make sense to define gates 708-718 as a single stage.

In yet another embodiment gates 708 can change at about the same time as any logic (not shown) that is driven by the output of latch 704. This is because latch 704 and latches 706 are clocked by virtually the same clock, CLK. (Note that latch 704 is clocked by CLK after 2 inverters. Thus, the latches 706 and 704 will change on the same clock edge, however, the clock edge will be delayed by at least 2 gate delays at latch 704.) Therefore, gates 708 and any logic (not shown) that is driven by the output of latch 704 can be grouped into a single stage. This is because the group of gates can change logic states at some time relative to each other, such that, if the gates are located near each other, shared resources can be impacted. Thus, the definition of a stage can vary from implementation to implementation and from design to design based on the particulars of the implementation or the design or parameters important to the design.

FIG. 8 is a diagram illustrating an example of different patterns and transparencies that can be used in conjunction with the systems and methods described herein. Three different patterns are illustrated. The patterns may best be seen along the right side of the diagram, and more specifically, in boxes 810, 812, and 814. Each box 810, 812, and 814 have 0% transparency. Thus, the patterns are more easily seen. It will be understood that, in addition to the three patterns illustrated here, many different patterns or other visual indications can be used. Generally, many different patterns will be needed, because most designs will have more than three different stages.

Transparencies can range from 100% transparent 808 to 0% transparent 810. In the example of FIG. 8 each box decreases 10% from the 100% transparency at the far left 808 to 0% transparency at the far right 810. Thus, from left to right the boxes are 100%, 90%, 80%, 70%, etc. Other increments can also be used including fewer or more increments between 100% and 0%.

Further, it will be understood that the transparency need not range from 100% to 0%. For example, 100% transparency will not allow a designer to determine what stage a cell is in because 100% transparency is simply an un-shaded box. (The box can contain a representation of the gate, e.g., an inverter, NAND gate, NOR gate, etc., but would contain no shading, thus, it would be difficult or impossible to determine what stage the gate is associated with.) Thus one stage with 100% transparency can look like any other stage with 100% transparency. Therefore, in one embodiment, 100% transparency will not be used.

On the other hand, a designer may not be concerned about cells that are not close to each other. Thus, it may not matter to the designer that he or she can not determine what stage a cell is in if the cell has a good distribution, for example, as indicated by a 100% transparency. Therefore, in another embodiment 100% transparency can be used. Similarly, for various reasons, certain embodiments may or may not decide to use 0% transparency or some other percentage as the lowest level of transparency.

In one embodiment the number of instances in the same time domain in a given area can be mapped to the level of transparency. Thus, one instance in a given area can map to for example 100% transparency, two instances can map to 90% transparency, etc. Ten or more instances can map to 0% transparency. It will be understood that other mappings are possible and that these mappings can be either linear or non-linear. Further in one embodiment the mapping can change, e.g., based on the size of the area selected.

As discussed with respect to FIG. 4, because FIG. 8 is a black and white drawing, line drawing patterns are used. Additionally, darker cells will be used to indicate cells located proximate to each other. It will be understood, however, that many different types of visual cues can be used to indicate cells in the same stage and cells located proximately to each other. For example, in another embodiment, different colors can be used in place of the different patterns. Further different brightness, hue, or saturation can be used to indicate different distances between cells in a stage. Further, in yet another embodiment, different colors can be used to indicate different distances between cells in a stage, e.g., green can indicate any cells with a good distribution, while red indicates cells with a bad distribution. In such an embodiment, it may be more important to the designer to flag bad distributions rather than indicating the stage the cells are included in. On the other hand, a simple green=good/red=bad implementation can be combined with different patterns to indicate different stages in the design.

As used herein, the term module is used to describe a given unit of functionality that can be performed in accordance with one or more embodiments of the present invention. As used herein, a module can be implemented utilizing any form of hardware, software, or a combination thereof. In implementation, the various modules described herein can be implemented as discrete modules or the functions and features described can be shared in part or in total among one or more modules. In other words, as would be apparent to one of ordinary skill in the art after reading this description, the various features and functionality described herein may be implemented in any given application can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 9:
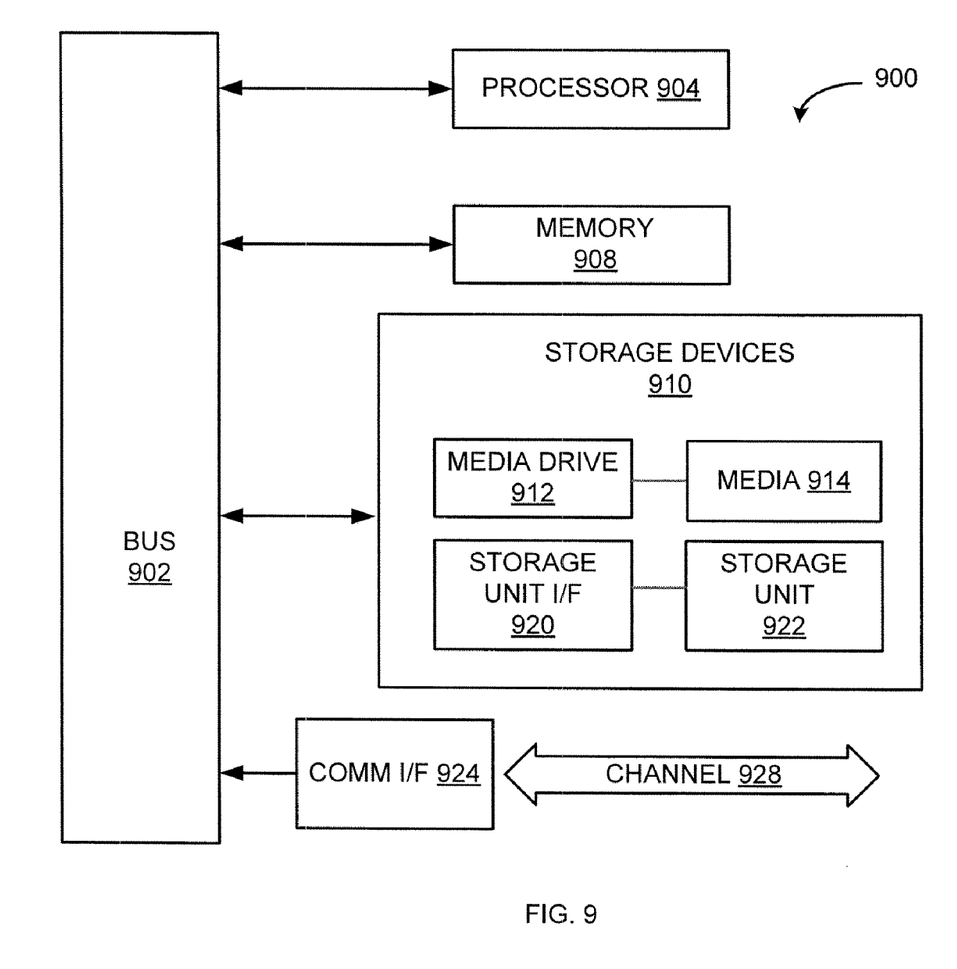
FIG. 9 is a diagram illustrating a computer system that can be used in conjunction with the systems and methods described herein.

The term tool can be used to refer to any apparatus configured to perform a recited function. Tools can include a collection of one or more modules and can also be comprised of hardware, software or a combination thereof. Thus, for example, a tool can be a collection of software modules, hardware modules, software/hardware modules or any combination or permutation thereof. As another example, a tool can be a computing device or other appliance on which software runs or in which hardware is implemented.

Where components or modules of the invention are implemented in whole or in part using software, in one embodiment, these software elements can be implemented to operate with a computing system capable of carrying out the functionality described with respect thereto. One such example computing system is shown in FIG. 9. Various embodiments are described in terms of this example computing system 900. After reading this description, it will become apparent to a person skilled in the relevant art how to implement the invention using other computing systems or architectures.

Referring now to FIG. 9, computing system 900 may represent, for example, desktop, laptop and notebook computers; hand-held computing devices (PDA's, smart phones, cell phones, palmtops, etc.); mainframes, supercomputers, workstations or servers; or any other type of special or general purpose computing devices as may be desirable or appropriate for a given application or environment. Computing system 900 can also represent computing capabilities embedded within or otherwise available to a given device. Computing system 900 can include one or more processors, such as a processor 904. Processor 904 can be implemented using a general-purpose or special-purpose processing engine such as, for example, a microprocessor, controller, or other control logic. In the example illustrated in FIG. 9, processor 904 is connected to a bus 902 or other communication medium to facilitate interaction with other components of computing system 900.

Computing system 900 can also include a main memory 908, preferably random access memory (RAM) or other dynamic memory, for storing information and instructions to be executed by processor 904. Main memory 908 also may be used for storing temporary variables or other intermediate information during execution of instructions to be executed by processor 904. Computing system 900 can likewise includes a read only memory ("ROM") or other static storage device coupled to bus 902 for storing static information and instructions for processor 904.

The computing system 900 can also include information storage mechanism 910, which can include, for example, a media drive 912 and a storage unit interface 920. The media drive 912 can include a drive or other mechanism to support fixed or removable storage media. For example, a hard disk drive, a floppy disk drive, a magnetic tape drive, an optical disk drive, a CD or DVD drive (R or RW), or other removable or fixed media drive. Storage media 914, can include, for example, a hard disk, a floppy disk, magnetic tape, optical disk, a CD or DVD, or other fixed or removable medium that can be read by and written to by media drive 912. As these examples illustrate, the storage media 914 can include a computer usable storage medium having stored therein particular computer software or data.

In alternative embodiments, information storage mechanism 910 may include other similar instrumentalities for allowing computer programs or other instructions or data to be loaded into computing system 900. Such instrumentalities can include, for example, a fixed or removable storage unit 922 and an interface 920. Examples of such storage units 922 and interfaces 920 can include a program cartridge and cartridge interface, a removable memory (for example, a flash memory or other removable memory module) and memory slot, a PCMCIA slot and card, and other fixed or removable storage units 922 and interfaces 920 that allow software and data to be transferred from the storage unit 922 to computing system 900.

Computing system 900 can also include a communications interface 924. Communications interface 924 can be used to allow software and data to be transferred between computing system 900 and external devices. Examples of communications interface 924 can include a modem or softmodem, a network interface (such as an Ethernet, network interface card, or other interface), a communications port (such as for example, a USB port, IR port, RS232 port or other port), or other communications interface. Software and data transferred via communications interface 924 are carried on signals, which can be electronic, electromagnetic, optical or other signals capable of being received by a given communications interface 924. These signals can be provided to communications interface 924 via a channel 928. This channel 928 can carry signals and can be implemented using a wired or wireless medium. Some examples of a channel can include a phone line, a cellular phone link, an RF link, an optical link, a network interface, a local or wide area network, and other communications channels.

In this document, the terms "computer program medium" and "computer usable medium" are used to generally refer media such as, for example, memory 908, storage unit 920, media 914, and signals on channel 928. These and other various forms of computer usable media may be involved in carrying one or more sequences of one or more instructions to processor 904 for execution. Such instructions, generally referred to as "computer program code" (which may be grouped in the form of computer programs or other groupings), when executed, enable the computing system 900 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which each block is presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method of graphically presenting electronic circuit design information comprising:
    evaluating, using a computer, an electronic circuit design comprising a plurality of cells, wherein at least two cells of the plurality are members of a stage in a timing path of the electronic circuit design, and the stage has an assigned visual indicator for cells within the stage;
    calculating, using a computer, a distance between a first cell within the stage and other cells within the stage;
    calculating, using a computer, a variant visual indicator for the first cell based on the distance, wherein the variant visual indicator is a variation of the assigned visual indicator; and
    displaying, using a computer, the first and second visual indicators on a layout of the electronic circuit design, wherein the variant visual indicator is applied to the first cell and the assigned visual indicator is applied to the other cells.

2. The computer-implemented method of claim 1, wherein the assigned visual indicator comprises a color.

3. The computer-implemented method of claim 2, wherein the variant visual indicator comprises a change in color.

4. The computer-implemented method of claim 2, wherein the distance is indicated in the variant visual indicator by brightness, hue, or saturation.

5. The computer-implemented method of claim 1, wherein the assigned visual indicator comprises a pattern.

6. The computer-implemented method of claim 1, wherein distance calculated comprises a Manhattan distance.

7. The computer-implemented method of claim 1, wherein the appearance of the assigned visual indicator is calculated based on power demand by each cell in the stage.

8. The method of claim 1, wherein the appearance of the assigned visual indicator is calculated based on the IR drop in the stage.

9. The method of claim 1, wherein the appearance of the assigned visual indicator is based on wire congestion in the stage.

10. A computer aided design tool performing the operations of:
    evaluating an electronic circuit design comprising a plurality of cells, wherein at least two cells of the plurality are members of a stage in a timing path of the electronic circuit design, and the stage has an assigned visual indicator for cells within the stage;
    calculating a distance between a first cell within the stage and other cells within the stage;
    calculating a variant visual indicator for the first cell based on the distance, wherein the variant visual indicator is a variation of the assigned visual indicator; and
    displaying using a computer the first and second visual indicators on a layout of the electronic circuit design, wherein the variant visual indicator is applied to the first cell and the assigned visual indicator is applied to the other cells.

11. The computer aided design tool of claim 10, wherein the assigned visual indicator comprises a color.

12. The computer aided design tool of claim 11, wherein the distance is indicated in the variant visual indicator by brightness, hue, or saturation.

13. The computer aided design tool of claim 10, wherein the assigned visual indicator comprises a pattern.

14. The computer aided design tool of claim 10, wherein distance calculated comprises a Manhattan distance.

15. The computer aided design tool of claim 10, wherein the appearance of the assigned visual indicator is calculated based on power demand by each cell in the stage.

16. The computer aided design tool of claim 10, wherein the appearance of the assigned visual indicator is calculated based on the IR drop in the stage.

17. The computer aided design tool of claim 10, wherein the appearance of the assigned visual indicator is based on wire congestion in the stage.

18. A computer comprising:
    a processor,
    a memory, coupled to the processor and configured to cause the processor to perform a stored sequence of instructions comprising:
    evaluating an electronic circuit design comprising a plurality of cells, wherein at least two cells of the plurality are members of a stage in a timing path of the electronic circuit design, and the stage has an assigned visual indicator for cells within the stage;
    calculating a distance between a first cell within the stage and other cells within the stage;
    calculating a variant visual indicator for the first cell based on the distance, wherein the variant visual indicator is a variation of the assigned visual indicator; and
    displaying using a computer the first and second visual indicators on a layout of the electronic circuit design, wherein the variant visual indicator is applied to the first cell and the assigned visual indicator is applied to the other cells.

19. The computer of claim 18, wherein the assigned visual indicator comprises a color.

20. The computer of claim 19, wherein the distance is indicated in the variant visual indicator by brightness, hue, or saturation.

21. The computer of claim 18, wherein the assigned visual indicator comprises a pattern.

22. The computer of claim 18, wherein the appearance of the assigned visual indicator is calculated based on power demand by each cell in the stage.

23. The computer of claim 18, wherein the appearance of the assigned visual indicator is calculated based on the IR drop in the stage.

24. The computer of claim 18, wherein the appearance of the assigned visual indicator is based on wire congestion in the stage.

* * * * *